United States Patent Office 3,351,606
Patented Nov. 7, 1967

3,351,606
OIL EXTENSION OF RUBBERY COMPOSITIONS
Robert C. Wheat, Bartlesville, Okla., assignor to Phillips Petroleum Company, a corporation of Delaware
No Drawing. Filed May 20, 1963, Ser. No. 281,807
4 Claims. (Cl. 260—33.6)

This invention relates to rubbery compositions which contain high proportions of extender oil. In another aspect it relates to a method of extending rubbery conjugated diene polymers with a relatively high amount of oily plasticizer.

Extending rubbery polymers with oil is a good way to reduce their cost. Ordinarily, however, the viscosity of the rubber used in the preparation of oil masterbatches decreases substantially as oil level is increased. At the higher oil levels the processability tends to be poor and physical properties are adversely affected. One means by which higher levels of oil can be tolerated lies in the use of polymers which have a very high initial Mooney viscosity. A sufficient amount of oil is then added to reduce the Mooney value to the desired level. Even then, the physical properties of the final product may be sacrificed.

I have now discovered that oil masterbatches containing from 25 to 100 and preferably from 25 to 75 parts by weight of extender oil per 100 parts of rubbery polymer can be prepared in such a manner that the resulting decrease in viscosity of the polymer is minimized. According to my invention this result can be realized by employing a conjugated diene polymer which contains mercapto groups positioned at the ends of the polymer molecules.

It is an object of my invention to provide an improved rubbery composition containing relatively high amounts of extender oil.

Another object of my invention is to provide a cured rubbery product which contains a high oil level but exhibits good physical properties.

Another object of my invention is to provide a method of extending conjugated diene polymer with high amounts of oily plasticizer in such a manner that the resulting decrease in viscosity of the polymer is minimized.

Other objects, advantages and features of my invention will be apparent to those skilled in the art from the following discussion.

Compositions of this invention can be prepared using mercapto-terminated polymers having Mooney viscosities in a normal range since the reduction in Mooney viscosity of these polymers by large amounts of extender oil is much less than that encountered with other rubbery polymers. Mercapto-terminated polymers having raw Mooney viscosities (ML–4 at 212° F.) in the range of about 40 to 75 can be used quite successfully with high loadings of oil. My invention can also be applied, however, to the oil extension of mercapto-terminated diene polymers of a higher Mooney viscosity, for example ranging from 75 up to 150. The standard method for determining Mooney viscosity is ASTM D 1646–61.

The mercapto-terminated polymers are prepared from conjugated dienes, preferably those having from 4 to 8 carbon atoms per molecule, such as 1,3-butadiene, isoprene, piperylene, 1,3-octadiene, and the like. Homopolymers can be formed from these dienes or they can be copolymerized with each other or with copolymerizable monomers containing vinylidene groups, such as the aryl-substituted olefins, vinyl or alpha methylvinyl-substituted pyridine or quinoline compounds, or acrylic and alkacrylic acid esters. Examples of these monomers include styrene, 2-vinylnaphthalene, 3-vinyltoluene, 2-vinylpyridine, 3-ethyl-5-vinylpyridine, 3,5-diethyl-4-isopropylpyridine, 2-vinylquinoline, 3-vinylisoquinoline, methyl acrylate, methyl methacrylate, ethyl methacrylate and the like.

Other suitable comonomers include methyl vinyl ether, vinyl chloride, vinylfuran, N-vinylcarbazole, acrylonitrile, and the like.

I prefer to prepare the mercapto-terminated polymers, also referred to herein as mercapto-telechelic polymers, of the above-named monomers by emulsion polymerization in which a xanthogen-type compound is used as a modifier.

Polymerization systems which are applicable are those that generate free radicals, e.g., oxidation-reduction systems. Oxidants which can be employed include hydrogen peroxide and organic peroxides or hydroperoxides. Among the reductants which can be used are ferrous pyrophosphate, polyalkylene polyamines such as tetraethylene pentamine which can be used alone or in conjunction with hydrazine or substituted hydrazines, carbonates of polyalkylene polyamines, sodium formaldehyde sulfoxylate, and the like. Examples of suitable polymerization systems and recipes are given in U.S. Patent 2,720,510 to Rothlisberger et al.

The modifiers which are employed are selected from the group consisting of xanthogen disulfides, thioxanthogen disulfides, and thiuram disulfides. They can be represented by the formulas

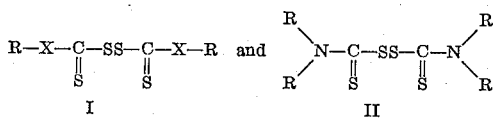

wherein R can be an alkyl, cycloalkyl, aryl, alkaryl, or aralkyl radical containing from one to eight carbon atoms and X is oxygen or sulfur. Formula I represents xanthogen disulfides and thioxanthogen disulfides and Formula II represents thiuram disulfides. Exemplary of these compounds are diisopropylxanthogen disulfide, diphenylthioxanthogen disulfide, dicyclohexylxanthogen disulfide, di-p-tolylxanthogen disulfide, dibenzylxanthogen disulfide, ethyl(n-butyl)thioxanthogen disulfide, tetraethylthiuram disulfide and tetraoctylthiuram disulfide. These modifiers are applicable in any emulsion polymerization systems where modifiers are normally employed. Polymers prepared in their presence contain end groups

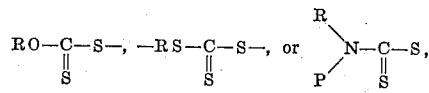

depending upon the type of modifier used.

The amount of modifier used is generally in the range of 0.05 to 10.0 parts by weight per 100 parts of monomer. The molecular weight of the polymer can be controlled by varying the concentration of modifier.

The polymers prepared in the presence of the modifiers hereinbefore described can be treated in various ways to convert the end groups to mercapto groups. The treating agents which are suitable for this conversion are as follows:

(1) Organometal compounds of alkali and alkaline earth metals including organometal halides of the latter e.g., n-butyllithium, isopropylpotassium, n-amylsodium, diethylcalcium, dihexylmagnesium, methylmagnesium iodide, phenylmagnesium bromide, and butylcalcium iodide;

(2) Hydrides of alkali and alkaline earth metals, including complex hydrides of alkali metals, e.g., sodium hydride, lithium hydride, calcium hydride, lithium aluminum hydride, and sodium borohydride;

(3) Alkali metal hydroxides such as lithium, sodium, and potassium hydroxides;

(4) Nitrogen bases such as ammonia, primary, secondary, and tertiary amines and polyamines (propylamine, diethylamine, tertiary butylamine, trimethylamine, ethylenediamine, diethylenetriamine, morpholine, pyridine, and the like), quaternary ammonium bases (tetramethyl ammonium hydroxide), and hydrazine and substituted hydrazines (phenylhydrazine).

The polymer can be treated in the latex or recovered and dissolved in a suitable solvent such as an aliphatic, cycloaliphatic or aromatic hydrocarbon, for example hexane, cyclohexane, benzene, toluene or the like. Dialkyl ethers and sulfides, as well as cyclic ethers and the corresponding thioethers and also polyethers can be used. Examples of these materials include diethyl ethers, diethyl sulfide, tetrahydrofuran, thiophene, dioxane, dimethoxyethane, and the like.

When the polymer is to be treated directly in the latex, one of the nitrogen base agents should be employed as the treating agent. If desired, the latex can be stripped of unreacted monomer and treated with a nitrogen base in a single operation. Shortstops which will not produce deleterious effects when the latex is treated with a nitrogen base should be used. Quinone-type compounds such as ditertiary butylhydroquinone and compounds of the carbamate type, such as sodium dimethyldithiocarbamate, are preferred.

The temperature of the treating step, whether carried out in solution or in the latex, can range from 5 to 100° C. or higher. Room temperature is suitable. The amount of treating agent can vary broadly but should be at least stoichiometric and preferably a large excess is used. The stoichiometric amount is 2 moles of treating agent per active group in the polymer. The resulting polymer contains about 2 reactive mercapto end groups per molecule. Some polymer molecules, however, may contain only one reactive group and a small number may be nonfunctional. In general the polymers are considered to be difunctional or telechelic if they contain an average of at least about 1.5 reactive groups per molecule.

When the polymer is treated in solution, water or an acid is added and the polymer is then recovered by coagulation with alcohol, salt-acid, or the like, washed and dried. After treating in the latex, the coagulation can be effected by any known means such as by using brine-alcohol, brine-acid, or the like.

Mercapto-telechelic polymers can also be prepared in solution in hydrocarbons such as cyclohexane, isooctane or toluene by contacting the monomers with organo dilithium initiators such as 1,4-dilithiobutane, dilithionaphthalene, 1,2-dilithio-1,2-diphenylethane, or the like. On completion of the polymerization the unquenched polymer solution is contacted with sulfur and then with a proton donor to replace the lithium atoms in the polymer with mercapto groups.

The oil which is used to extend the polymers according to my invention can be selected from those normally used in the rubber compounding art. It is preferably a liquid or oily material at room temperature although solid or semisolid plasticizers can be used when they become liquid at the elevated mixing temperatures used, which may be as high as 250–275 F. The preferred liquid plasticizer is ordinarily a mineral oil or has a mineral oil base, and preferably has both a low pour point and a low aniline point as determined by ASTM D 97–57 and ASTM D 611–55T, respectively. While mineral oils are preferred as the oily plasticizer and give compounds of exceptional properties, other oily materials such as coal tar oils and the like can be used for all or part of the plasticizer. For ordinary use the plasticizer should have an initial boiling point of 450 F. or higher, and preferably of 550 to 600 F. or higher. It should have a pour point of 70 F. or lower, preferably of 45 F. or lower, and an aniline point of 300 F. or lower, preferably 140 F. or lower.

The oil can be compounded with the polymer in any conventional manner. It is preferred to add an emulsion of the oil to the hydrolyzed polymer latex prior to coagulation in the rubber. Solution masterbatching can also be employed. Polymer thus extended with oil is compounded with from 50 to 200 parts by weight of carbon black per 100 parts of polymer exclusive of the oil. Other ingredients normally used in rubber compounding recipes can be included.

To illustrate further the advantages of my invention, the following example is presented. The conditions and proportions of this example are typical only and should not be construed to limit my invention unduly.

*Example*

Two butadiene-styrene polymers were prepared by an emulsion polymerization process using the following recipes:

|  | Parts by Weight | |
|---|---|---|
|  | A | B |
| Butadiene | 70 | 70 |
| Styrene | 30 | 30 |
| Water | 180 | 180 |
| Potassium Fatty Acid Soap | 5 | 5 |
| KCl | 0.4 | 0.4 |
| KOH | 0.03 | 0.03 |
| Questex [1] | 0.051 | 0.051 |
| $FeSO_4 \cdot 7 H_2O$ | 0.014 | 0.014 |
| Sodium Formaldehyde Sulfoxylate | 0.066 | 0.066 |
| p-Menthane Hydroperoxide | 0.08 | 0.08 |
| Diisopropyl Xanthogen Disulfide | 0.2 |  |
| Tert-dodecylmercaptan |  | 0.2 |
| Time, hours | 7.5 | 3.9 |
| Temperature, °F | 41 | 41 |

[1] Questex is the tetrasodium salt of ethylenediamine tetra-acetic acid with 4 molecules of water of hydration.

The polymerizations were shortstopped with 0.2 parts of sodium dimethyldithiocarbamate. The xanthate groups of Polymer A were converted to mercapto groups by addition of 3.0 parts of ethylenediamine. To each latex was added an oil emulsion prepared according to the following recipe.

|  | Parts by Weight |
|---|---|
| Philrich 5 [1] | 100 |
| AO–2246 [2] | 4 |
| Oleic acid | 2.78 |
| NaOH | 0.39 |
| Water | 96.6 |

[1] Philrich 5 (a trademark) is a highly aromatic extender or plasticizer oil having an initial boiling point of 600° F. or higher, a pour point below 65° F., and an aniline point of 100 to 140° F.
[2] AO–2246 is 2,2'-methylene-bis(4-methyl - 6 - tert-butylphenol) which serves as an antioxidant.

After blending the latices were coagulated with brine-acid, the polymers recovered, washed and dried. By analysis, each polymer contained 31.6 phr. oil.

Mooney viscosities (ML–4 at 212° F.) of these polymers were as follows:

|  | Parent Polymer | Oil Masterbatch | percent Reduction |
|---|---|---|---|
| Mercapto Telechelic Polymer A | 54 | 47 | 13.0 |
| Nontelechelic Polymer B | 35 | 19 | 46.7 |

The foregoing data demonstrate that the Mooney value of the compositions of the invention is not greatly changed by the high loading of oil present while at the same oil level, Mooney value of a polymer prepared in the same manner except that terminal mercapto groups were not present was reduced by nearly 50 percent.

These rubbers were compounded and cured for evaluation along with an SBR (Polymer C) rubber prepared according to the type 1712 recipe in ASTM D 1416–61T and having a Mooney viscosity (ML–4 at 212° F.) of 50 after masterbatching with 37.5 phr. Philrich 5. Compounding recipes and physical properties of these rubbers are shown in Table I.

TABLE I

| Polymer [1] | Parts by Weight | | |
|---|---|---|---|
| | A | B | C |
| Polymer Masterbatch [2] | 137.5 | 137.5 | 137.5 |
| High abrasion furnace black | 68.75 | 68.75 | 68.75 |
| Zinc Oxide | 3 | 3 | 3 |
| Stearic acid | 1 | 1 | 1 |
| Flexamine [3] | 1 | 1 | 1 |
| Sulfur | 2 | 2 | 2 |
| Santocure [4] | 1 | 1 | 1 |
| Raw Mooney Ml-4 at 212° F | 47 | 19 | 50 |
| Comp. Mooney MS-1½ at 212° F | 36.6 | 21.1 | 36.1 |
| Physical Properties (cured 30 Min. at 307° F.): | | | |
| $\nu \times 10^4$, moles/cc.[5] | 1.34 | 1.11 | 1.08 |
| 300% Modulus, p.s.i.[6] | 1,530 | 1,190 | 1,170 |
| Tensile, p.s.i.[6] | 3,440 | 2,980 | 3,000 |
| Elongation, percent [6] | 575 | 610 | 615 |
| ΔT, ° F.[7] | 60.8 | 68.3 | 62.8 |
| Resilience, percent [8] | 58.3 | 53.9 | 57.9 |
| Oven Aged 24 Hr. at 212° F.: | | | |
| 300% Modulus, p.s.i. | 2,400 | 1,940 | 1,900 |
| Tensile, p.s.i. | 2,910 | 2,610 | 2,650 |
| Elongation, percent | 365 | 410 | 400 |
| ΔT, ° F | 55.8 | 63.2 | 54.1 |
| Resilience, percent | 64.6 | 60.6 | 63.1 |

[1] All three compositions exhibited good extrusion characteristics.
[2] The 137.5 parts of masterbatch include 100 parts of polymer and 37.5 parts of oil.
[3] Flexamine is a physical mixture containing 65 percent of a complex diarylamine-ketone reaction product and 35 percent of N,N'-diphenyl-p-phenylenediamine.
[4] Santocure is N-cyclohexylbenzothiazole-2-sulfenamide.
[5] Rubber World 135, 67–73, 254–60 (1956).
[6] ASTM D 412-61T. Scott Tensile Machine L-6. 80° F.
[7] ASTM D 623-58. Method A, Goodrich Flexometer, 143 lb./sq. in. load, 0.175-inch stroke. Test specimen is a right circular cylinder 0.7-inch in diameter and 1 inch high.
[8] ASTM D 945-59 (modified). Yerzley oscillograph. Test specimen same as in footnote (7).

The above data show that the mercapto-telechelic polymer masterbatch containing a high amount of oil when compounded and cured provided a product superior to that obtained with the nontelechelic polymer (Polymer B). The product made from Polymer A had higher modulus and tensile strength in both aged and unaged specimens. Also the product from Polymer A exhibited less heat build-up on flexing and higher resilience. Compared with a butadiene/styrene rubber having similar raw and compounded Mooney values (Polymer C), the mercapto-telechelic polymer is shown to be superior when used in the high oil recipe.

As will be apparent to those skilled in the art from the above disclosure, other embodiments and modifications of my invention can be made without departing from the spirit or scope thereof.

I claim:
1. A rubbery composition comprising 100 parts by weight of a conjugated diene polymer having terminal mercapto groups and 25 to 100 parts by weight of an extender oil.
2. A cured rubbery composition comprising 100 parts by weight of a polymer of conjugated dienes having 4 to 8 carbon atoms per molecule, 50 to 200 parts by weight of carbon black and 25 to 100 parts by weight of rubber extender oil, said polymer prior to curing having mercapto groups positioned at the ends of its molecules.
3. A curable rubbery composition comprising 100 parts by weight of terminal mercapto-telechelic polybutadiene and 25 to 75 parts by weight of an aromatic extender oil.
4. A curable rubbery composition comprising 100 parts by weight of terminal mercapto-telechelic butadiene-styrene copolymer and 25 to 75 parts by weight of an aromatic extender oil.

References Cited
UNITED STATES PATENTS

| | | | |
|---|---|---|---|
| 2,964,083 | 12/1960 | Pfau et al. | 260—33.6 |
| 3,047,544 | 7/1962 | Byrd | 260—79 |
| 3,135,716 | 6/1964 | Uraneck et al. | 260—45.5 |
| 3,193,590 | 7/1965 | Hsieh | 260—94.7 |

JULIUS FROME, *Primary Examiner.*

A. H. KOECKERT, *Assistant Examiner.*